(12) United States Patent
Simofi-Ilyes et al.

(10) Patent No.: US 9,624,817 B2
(45) Date of Patent: Apr. 18, 2017

(54) COOLING FAN MODULE AND ADAPTER DEVICE THEREFOR

(75) Inventors: Attila Simofi-Ilyes, Clarkston, MI (US); Milenko Stamenic, Winsdsor (CA); Thomas Wissmueller, Rochester Hills, MI (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 1038 days.

(21) Appl. No.: 13/415,973

(22) Filed: Mar. 9, 2012

(65) Prior Publication Data

US 2013/0236312 A1    Sep. 12, 2013

(51) Int. Cl.
| | |
|---|---|
| *F04D 13/06* | (2006.01) |
| *F04D 29/056* | (2006.01) |
| *F04D 29/32* | (2006.01) |
| *F01P 5/04* | (2006.01) |

(52) U.S. Cl.
CPC ........... *F01P 5/04* (2013.01); *F01P 2005/046* (2013.01); *F01P 2070/50* (2013.01)

(58) Field of Classification Search
CPC ...... F04D 29/04; F04D 29/05; F04D 29/0563; F04D 29/059; F04D 29/0613; F04D 29/329; F04D 13/0613
USPC .................. 416/179, 204 R, 219 R, 244 R
See application file for complete search history.

(56) References Cited

U.S. PATENT DOCUMENTS

| | | | | |
|---|---|---|---|---|
| 4,797,602 | A | * | 1/1989 | West ................ 322/10 |
| 5,654,598 | A | * | 8/1997 | Horski ............. 310/67 R |
| 5,844,338 | A | * | 12/1998 | Horski ............... 310/90 |
| 5,944,497 | A | * | 8/1999 | Kershaw et al. ....... 417/423.8 |
| 6,158,985 | A | * | 12/2000 | Watanabe et al. ..... 417/423.14 |
| 6,384,494 | B1 | * | 5/2002 | Avidano et al. ....... 310/58 |
| 7,034,416 | B2 | * | 4/2006 | Simofi-Ilyes et al. ....... 310/58 |
| 7,345,386 | B2 | * | 3/2008 | Dano et al. ............. 310/61 |
| 2006/0103245 | A1 | * | 5/2006 | Simofi-llyes et al. ..... 310/58 |

* cited by examiner

*Primary Examiner* — Sean J Younger
(74) *Attorney, Agent, or Firm* — Manelli Selter PLLC; Edward J. Stemberger

(57) ABSTRACT

The present invention provides a cooling fan module for an automotive cooling system, comprising: a cooling fan having a hub and a plurality of fan blades extending from the hub; a motor for driving the cooling fan, the motor having a rotor mounted or supported for rotation about an axis on a fixed shaft or axle of the motor; and an adapter device by means of which the cooling fan is attached to the rotor, wherein the adapter device comprises a connection member for rotationally fixed connection to a body of the rotor, and an attachment member for attachment with the hub of the cooling fan. The connection member may comprise a stub, which is desirably inserted into a central opening or aperture of the rotor body and the adapter device desirably accommodates at least one bearing upon which the rotor is supported for rotation about the rotational axis.

18 Claims, 4 Drawing Sheets

COOLING FAN MODULE AND ADAPTER DEVICE THEREFOR

FIELD OF THE INVENTION

The present invention relates to a cooling fan module, and has particular application to use in automotive cooling systems, in which cooling fan modules or units are provided having cooling fans driven by electric motors. The invention also relates to an adapter device for attaching or mounting a cooling fan to an electric motor in such a cooling fan module.

BACKGROUND OF THE INVENTION

Automotive cooling systems often employ cooling fans which are driven by electric motors and this requires that the fan be physically attached to the motor in some manner. Such cooling fan and motor systems or modules are desirably relatively compact, with the axial length of the fan and motor assembly desirably minimized in order to be accommodated in the ever-decreasing design space allocated under the hood of a modern automobile. Another imperative in the automotive industry is to reduce manufacturing costs through simplification of parts fabrication and assembly. In an effort to maximize fuel economy, it is also desirable to reduce the weight of the fan and motor assembly wherever feasible. As persons skilled in the art will appreciate, endeavoring to minimize size, weight, noise and vibration during the life cycle of a cooling fan module as well as reducing manufacturing costs, while simultaneously endeavoring to enhance reliability, often presents conflicting design parameters, and ultimately design choices.

Previously known cooling fan and motor assemblies have attached the fan to the motor shaft with radial spring clips, similar to belleville washers, which provided axial tension to secure the fan to the shaft. The spring clip typically engaged the shaft via a groove formed in the shaft. Over the life cycle of the fan and motor, the spring clip could have fatigued and thereafter broken, thus causing separation of the fan from the motor shaft. The addition of a spring clip attachment system to a fan and motor assembly also inherently increased the axial length of the assembled structure. Furthermore, the spring clip did not readily inhibit a rocking of the fan relative to the motor shaft because: (a) the spring clip typically flexed in response to rocking loads on the fan, and (b) the relatively small diameter of the spring clip did not provide a sufficiently large bearing surface to counteract rocking loads on the fan.

Another known attachment system for cooling fans and motor shafts involved molding a metal hub within the fan. The metal hub was then attached to the motor shaft via a pin, such as a roll pin. Although this molded-in-place hub and pin attachment system provided an effective and reliable fan connection, it increased the manufacturing complexity of the cooling fan modules in a number of ways. First, the motor shaft was drilled to receive the pin. Second, plastic fans which included molded-in-place metal hubs were inherently more expensive to manufacture than fans which were only constructed of plastic. Third, the fan and motor assemblies which required insertion of pins added additional manufacturing assembly steps.

Hence, it remains a challenge in the automotive industry to provide a cooling fan module or unit which has a compact structure (e.g. a compact axial length of the assembly) and which maintains both reliability and good dynamic balance (e.g. low vibration and noise) over the life cycle of the product, but which is nevertheless relatively inexpensive to manufacture and assemble.

SUMMARY OF THE INVENTION

In accordance with the present invention, a cooling fan module or unit having the features of claim 1 or claim 5, a rotor subassembly for a motor of a cooling fan module having the features of claim 11, and/or an adapter device for attaching a cooling fan to a motor of a cooling fan module having the features of claim 13 is provided.

According to one aspect, therefore, the invention provides a cooling fan module for an automotive cooling system, comprising:

a cooling fan having a hub and a plurality of fan blades extending from the hub;

a motor for driving the cooling fan, the motor having a rotor mounted or supported for rotation about an axis on a fixed (non-rotatable) shaft or axle of the motor; and an adapter device by means of which the cooling fan is attached to the rotor, wherein the adapter device comprises a connection member for rotationally fixed connection to a body of the rotor, and an attachment member for attachment with the hub of the cooling fan.

In a preferred embodiment, the connection member is inserted in an opening or aperture in the rotor body, preferably a central aperture or opening of the rotor body. Accordingly, the connection member may comprise a stub which is inserted into the rotor body proximate to or about the rotational axis of the rotor. In a particularly preferred embodiment, the adapter device accommodates at least one bearing upon which the rotor is supported for rotation about the rotational axis. In this regard, the stub is preferably hollow, e.g. in the form of a generally cylindrical sleeve or barrel, and accommodates the shaft or axle of the motor upon which the rotor is supported for rotation relative thereto about the axis. In this way, the adapter device may accommodate the at least one bearing such that it receives and/or engages with the shaft or axle accommodated within the hollow stub.

According to another aspect, the invention provides a cooling fan module or unit for an automotive cooling system, comprising:

a cooling fan having a hub and a plurality of fan blades extending from the hub;

a motor for driving the cooling fan, the motor having a rotor configured for rotation about an axis; and an adapter device by means of which the cooling fan is attached to the rotor, the adapter device comprising: a connection member in rotationally fixed connection with the rotor, preferably proximate to or about the rotational axis, and an attachment member for attachment with the hub of the cooling fan, wherein the adapter device accommodates at least one bearing upon which the rotor is supported for rotation about the rotational axis.

In a preferred embodiment, the adapter device accommodates the at least one bearing in a cavity or recess formed in, or adjacent to, the connection member, wherein the at least one bearing is a rotary bearing, preferably in the form of a roller bearing, a journal bearing or a bushing. In a particularly preferred embodiment, the adapter device accommodates a first bearing in a first cavity or recess, which may be formed at an end region of the connection member (e.g. adjacent to the attachment member) and a second bearing in a second cavity or recess, which may be formed at an opposite end region of the connection member. In an exemplary embodiment, the adapter device has a multi-part construction comprising a first part having the first cavity or recess at the one end region of the connection member, and a second part having the second cavity or recess at the opposite end region of the connection member.

As noted above, in a preferred embodiment, the connection member comprises a stub which may be axially inserted and rotationally fixed in an aperture or opening of the rotor, e.g. a central aperture or opening of the rotor. In a particularly preferred embodiment, the stub is hollow and accommodates a fixed (non-rotatable) shaft or axle of the motor upon which the rotor is supported for rotation about the axis. Thus, the at least one bearing receives and/or engages with the shaft or axle accommodated within the hollow stub. The bearing(s) is/are arranged to support the rotor for rotation on the shaft or axle of the motor, while the shaft or axle itself does not rotate but remains fixed or stationary in the motor as a mount or support for the rotor.

The motor in the cooling fan module or unit of the invention is typically an electric motor and is preferably a brushless motor, such as a brushless AC motor or brushless DC motor. Accordingly, the rotor may be a permanent magnet rotor and desirably has a relatively flat or disc-shaped body with a short axial extent. The rotor body preferably comprises a plurality of permanent magnets arranged to extend radially and substantially uniformly spaced apart from one another about the axis of the rotor. The rotor is typically spaced by a small air-gap from a surrounding stator, which may comprise a series of separate windings or coils in an annular arrangement about the rotor.

In a preferred embodiment, the attachment member is provided at an end region of the connection member. In this regard, the attachment member preferably extends radially outwardly from the connection member, e.g. in the form of a flange or a plate, and includes a plurality of fastening elements, which may optionally be arranged spaced apart around a circumference of the attachment member, for effecting attachment with the hub of the cooling fan. Thus, in the case of a relatively flat, disc-shaped rotor body, the attachment member may extend parallel and adjacent to a front face or side of the rotor body.

In a preferred embodiment, the adapter device is formed as a separate component which is subsequently assembled with the motor and the cooling fan. The adapter device may be integrally formed as a unitary component. That is, the connection member and attachment member may be formed integrally as a unitary component. Alternatively, the adapter device may comprise a number of separate parts or components that are combined or assembled together, e.g. in a two-part structure. The adapter device may be formed from a metal (e.g. steel, aluminium, brass, or other alloy) as a cast or sintered component or from a robust polymer plastic material (e.g. HDPE, PU, or PVC) as moulded component. Other materials having the desired strength and durability are, of course, also contemplated.

One type of automotive cooling system for which the cooling fan module of the invention is particularly suitable is the system conventionally used for cooling automotive internal combustion engines. That system typically employs a liquid as a coolant, which is pumped around the engine block to remove heat generated during the internal combustion process. The liquid coolant is then passed through a heat exchanger to cool it before the liquid is re-circulated back to the engine block. Although conventionally known as a "radiator", the heat exchanger typically transfers heat via forced convention rather than thermal radiation. The cooling fan module of the invention may be configured to be mounted on or adjacent to the automobile heat exchanger or "radiator", so that the cooling fan generates a forced air-flow over or through the heat exchanger to remove heat from the liquid coolant. In use, the cooling fan module of the invention may be powered by a battery and/or by a generator of the automobile.

According to a further aspect, the invention provides a rotor subassembly for an electric motor of a cooling fan module for an automotive cooling system, comprising:

a rotor configured for rotation about a rotational axis in an electric motor; and an adapter device for attaching a cooling fan to the rotor, the adapter device comprising a connection member which is rotationally fixed in an aperture or opening of the rotor, and an attachment member provided at an end region of the connection member for attachment with the hub of the cooling fan, wherein at least one bearing is accommodated by or in the adapter device to support the rotor for rotation about the rotational axis in the motor.

In a preferred embodiment, the connection member is axially inserted and rigidly fixed in a central aperture or opening of the rotor. The connection member may comprise a stub, and particularly a hollow stub, e.g. in the form of a generally cylindrical sleeve or barrel, which is configured to receive and accommodate a shaft or axle of the motor upon which the rotor is supported for relative rotation, wherein the at least one bearing is configured to receive and/or engage with the shaft or axle accommodated within the hollow stub.

According to a yet another aspect, the invention provides an adapter device for attaching a cooling fan to a motor in a cooling fan module in an automotive cooling system, comprising:

a connection member for rotationally fixed connection with a rotor of the motor, preferably in a vicinity of or about a rotational axis of the motor; and an attachment member provided at an end region of the connection member for attachment of a cooling fan thereto;

wherein the adapter device is configured to accommodate at least one bearing which supports the rotor for rotation about the axis.

As already noted above, in a preferred embodiment the adapter device comprises at least one cavity or recess configured to accommodate a bearing for supporting the rotor for rotation about the axis. The at least one cavity or recess is preferably formed in or adjacent to the connection member; for example, at one or more end region thereof. In a particularly preferred embodiment, the adapter device includes a first cavity or recess formed at an end region of the connection member (e.g. proximate the attachment member) and configured to accommodate a first bearing, and a second cavity or recess formed at an opposite end region of the connection member and configured to accommodate a second bearing. In this regard, the adapter device may optionally have a multi-part construction comprising a first part having the first cavity or recess, and a second part having the second cavity or recess.

In a preferred embodiment, the connection member comprises a stub configured to be axially inserted and rigidly fixed in a central aperture or opening of the rotor. The stub is preferably hollow (e.g. in the form of a generally cylindrical sleeve or barrel) and may be configured to accommodate a fixed (non-rotatable) shaft or axle of the motor upon which the rotor is supported for rotation about the rotational axis. As such, the bearing is preferably accommodated in the adapter device for engagement with the shaft or axle of the motor upon which the rotor is supported for rotation relative thereto.

In a preferred embodiment, the attachment member extends radially outwardly from the connection member, e.g. in the form of a flange or plate, and may comprise one or more fastening elements in a periphery of the attachment member for effecting attachment of the cooling fan.

Thus, in a particularly preferred embodiment, the invention provides an adapter device for attaching a cooling fan to a motor in a cooling fan module or unit of an automotive cooling system, the adapter device comprising:

a stub for substantially fixed or rigid connection with a rotor of the motor, wherein the stub is configured to be axially inserted and fixed in a central aperture or opening of the rotor;

a flange member provided at an end region of the stub and extending radially outwardly therefrom for attachment of a cooling fan thereto, wherein the flange member has a plurality of elements spaced apart around its circumference for effecting attachment to the cooling fan; and at least one cavity configured to accommodate a bearing which supports the rotor for rotation about the axis.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

Figure 1:
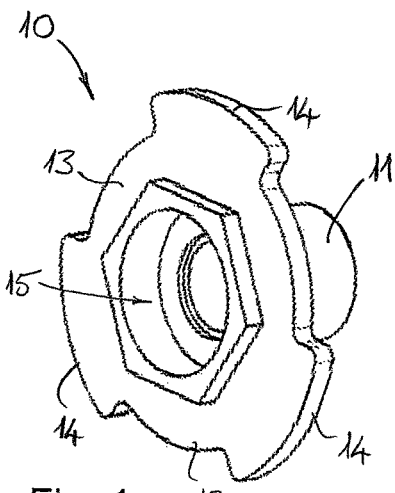
FIG. 1 shows a perspective view of an adapter device for a cooling fan module according to a first embodiment of the invention.
Figure 2:
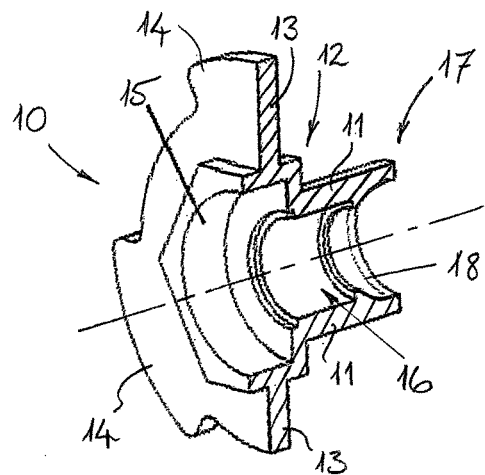
FIG. 2 shows a sectioned perspective view of the adapter device in FIG. 1.

Skilled artisans will appreciate that elements in the figures are illustrated for simplicity and clarity and are not necessarily drawn to scale. That is, the chosen elements are illustrated to enhance an understanding of the functionality and arrangement of features in the various embodiments. Common and well understood elements that may be useful or necessary in a commercially feasible embodiment are not necessarily depicted in order to facilitate a less abstracted view of the embodiments. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study, except where specific meanings have otherwise be set forth herein.

DETAILED DESCRIPTION OF PREFERRED EMBODIMENTS

With reference firstly to FIGS. 1 to 5 of the drawings, an adapter device 10 for attaching a cooling fan (not shown) to a rotor 20 of an electric motor 40 in a cooling fan unit 50 for use in an automotive cooling system will now be described in detail. The adapter device 10 is illustrated in isolation in FIGS. 1 and 2 and as part of a rotor subassembly 30 in FIG. 3 and FIG. 4 for the cooling fan module 50. The adapter device 10 in this particular embodiment is constructed as a unitary or single-part component and may, for example, be formed in a desired shape from a metal (e.g. steel, aluminium, brass, or other alloy) as a cast or sintered component or from a robust polymer plastic material (e.g. HDPE, PU, or PVC) as moulded component.

The adapter device 10 is specifically designed to provide easy attachment of a cooling fan to the rotor 20 of the electric motor 40. To this end, with particular reference to FIG. 1 and FIG. 2 of the drawings, the adapter device 10 includes a hollow stub 11 in the form of a short cylindrical or barrel-like member for substantially rigid connection with a body 22 of the rotor 20 in the motor 40 of the cooling fan module. At one end region 12 of the hollow stub 11, the adapter device 10 further includes a flange or plate member 13, which extends radially outwardly from the hollow stub 11 and has three lobe elements 14 equally spaced apart around its periphery or circumference. As will be described in more detail later, these lobe elements 14 at the periphery of the flange or plate member 13 are designed to securely fasten with a hub of the cooling fan. Centrally of the adapter device 10 at the end region 12 of the hollow stub 11, a first circular cylindrical cavity or recess 15 is provided. This first cavity or recess 15 is surrounded by, and at least partially counter-sunk with respect to, the flange or plate member 13 and communicates with a central bore 16 of the hollow stub 11. Similarly, as is clearly apparent from FIG. 2 of the drawings, at an opposite end 17 of the hollow stub 11 a second annular recess or cavity 18 is provided in communication with the central bore 16 of the hollow stub 11.

Figure 3:
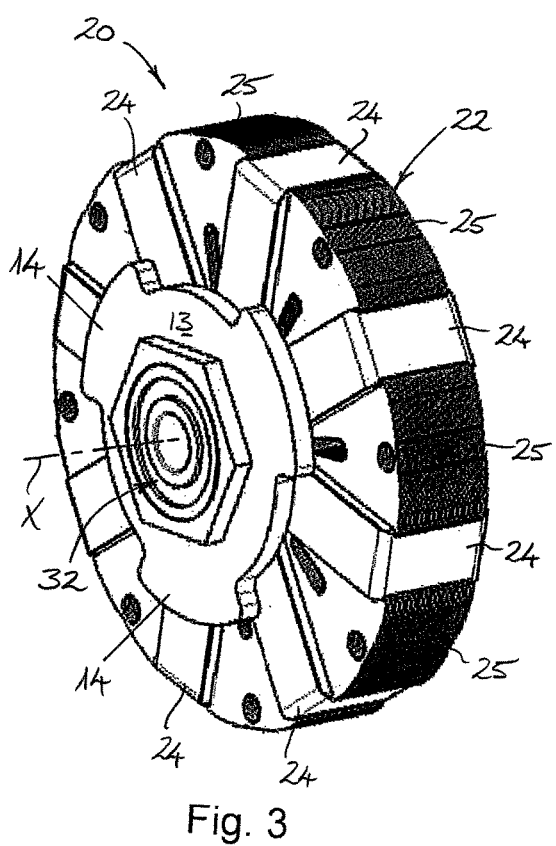
FIG. 3 shows a perspective view of a rotor subassembly for a cooling fan module according to the first embodiment incorporating the adapter device of FIG. 1.
Figure 4:
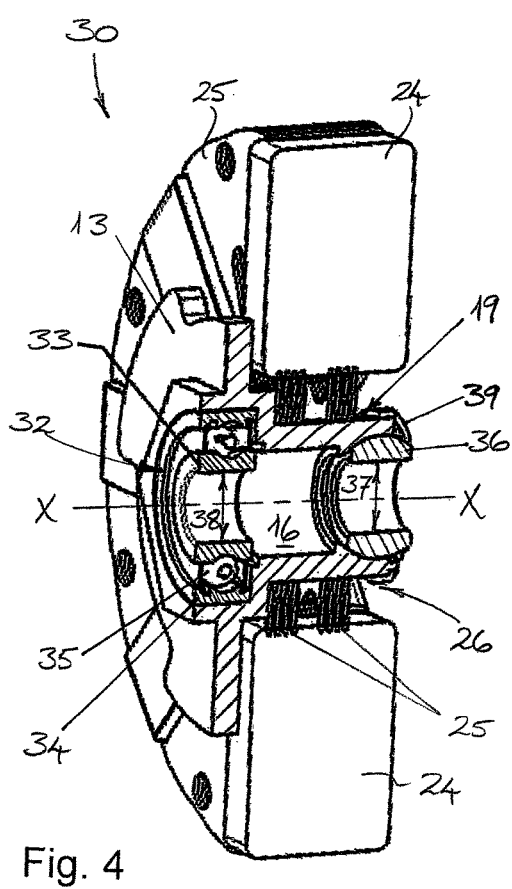
FIG. 4 shows a sectioned perspective view of the rotor subassembly in FIG. 3.

Referring now to FIGS. 3 and 4 of the drawings, the combination of the adapter device 10 with the rotor 20 to form the rotor subassembly 30 illustrates the functional configuration of the adapter device 10 more clearly. The rotor 20 is a permanent magnet rotor and has a relatively flat, disc-shaped rotor body 22, i.e. with a short axial extent. The rotor body 22 includes a plurality of rectangular or block-like permanent magnets 24 arranged uniformly spaced apart and extending radially outwards from a central axis X of rotor 20. Between each of the permanent magnets 24, the rotor body 22 further includes segments 25 of a rotor lamination core. In the centre of the rotor body 22 around the axis X, the rotor 20 includes a hole or opening 26 into which the stub member 11 is axially inserted, e.g. in a press-fit or an interference fit, such that the adapter device 10 is rotationally fixed (e.g. rigidly fixed) with respect to the rotor 20. In this regard, radially inner elements of the rotor lamination core 25 can be seen in FIG. 4 to physically engage with an outer surface 19 of the hollow stub 11.

As is particularly apparent from FIG. 4 of the drawings, the first cavity or recess 15 of the adapter device 10 forms a first bearing socket for accommodating a roller bearing 32. The roller bearing 32 comprises an inner ring 33 adapted to be fixed on a supporting element, an outer ring 34 which is fixed in the socket 15, e.g. again by a press-fit or interference fit or, alternatively, by an adhesive (e.g. contact cement), and a plurality of roller elements 35 housed between the inner ring 33 and the outer ring 34 so that the rings 33, 34 are rotatable relative to one another about the axis X. The second cavity 18 at the opposite end region 17 of the hollow stub 11 rigidly held within the central opening 26 through the rotor body 22 also accommodates a rotary bearing 36, this time in the form of a bushing or journal bearing having an internal diameter 37 which is slightly larger than an internal diameter 38 of the inner ring 33 of the roller bearing 32. The bushing or journal bearing 36 is held in the second cavity 18 by means of an annular retainer clip 39.

Figure 5:
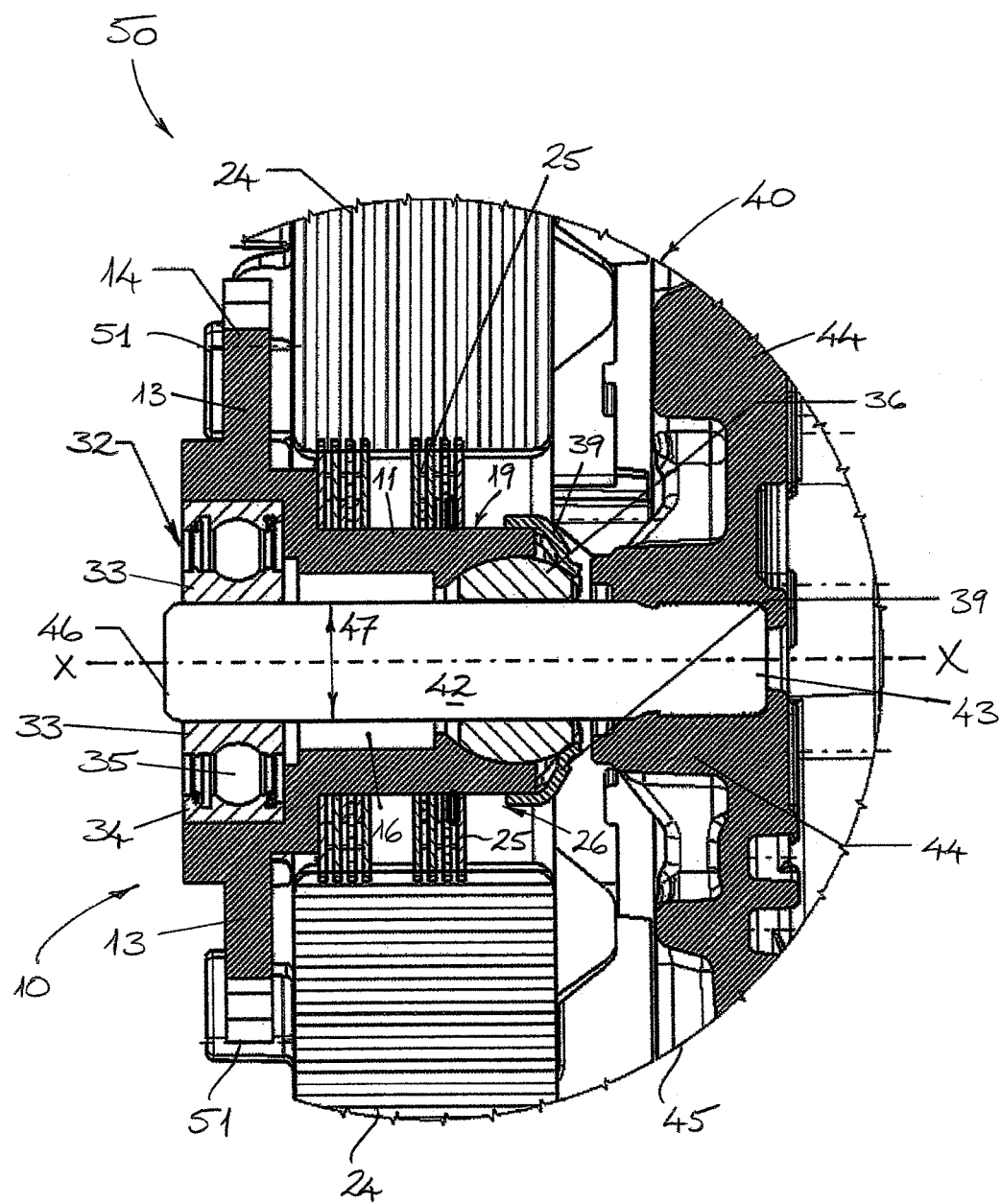
FIG. 5 shows a partial cross-section of a motor assembly in the cooling fan module of the first embodiment incorporating the adapter device of FIG. 1.

Referring now to FIG. 5 of the drawings, a detail of the cooling fan module 50 according to the first embodiment of the invention illustrates the physical and functional interaction of the adapter device 10 and the rotor subassembly 30 with the motor 40 of the module 50. The motor 40 includes a shaft or axle 42, an end 43 of which is rigidly fixed in a wall 44 of the motor housing 45 such that the shaft or axle 42 extends as a cantilever in the motor 40 for supporting the rotor 20 for rotation about the axis X. The electric motor 40 employed in this embodiment is a brushless DC motor, which are common in fan drives in adjustable or variable speed applications as they can develop high torque with good speed response and also have good thermal characteristics and high energy efficiency. Typically, the motor 40 will have a power rating in the range of about 300 to about 1200 W and energy efficiency in the range of about 80% to 90%. To obtain a variable speed response, the brushless DC motors typically include an electronic controller (not shown) and a rotor position feedback sensor. The controller electronically commutates the motor by providing a pulse width modulated output that is based on the speed set-point and the actual rotor position to ramp the motor's speed up or down as required by the load. As the electronic controller typically generates a significant amount of heat, it may be mounted on the wall 44 of the housing 45, which then acts as a heat sink for the controller.

In assembling the cooling fan module 50, the rotor subassembly 30 shown in FIGS. 3 and 4 can be assembled with the rest of the motor 40 by placing the second bearing 36 over a free end 46 of the shaft or axle 42 and axially sliding the second bearing 36 along the shaft 42 towards its fixed end 43, such that the shaft 42 is thereby accommodated in the bore 16 of the hollow stub 11. In this regard, the second bearing 36, which takes the form of a bushing or journal bearing at a rear side of the rotor subassembly 30, has an internal diameter 37 slightly greater than an outer diameter 47 of the shaft 42 so that it can be slidably mounted onto the shaft or axle of the motor. The small clearance provided by the bushing or journal bearing 36 with the outer diameter 47 of the shaft or axle 42 ensures good axial orientation and the bushing or journal 36 is desirably formed of a porous, sintered powdered metal or another known suitable journal material (e.g. brass) and is usually pre-lubricated to ensure low frictional running of the rotor 20. After sliding the rotor subassembly 30 onto the shaft or axle 42 of the motor, the free end 46 of the shaft 42 comes into contact with the inner ring 33 of the roller bearing 32, which is, in turn, then press-fitted onto that free end 46 of the shaft 42 for a rotationally fixed connection therewith, to achieve the configuration as shown in FIG. 5.

With this configuration, the flange member 13 having the lobe elements 14 is positioned adjacent, and extends parallel to, a front face of the rotor body 22. In this embodiment, the lobe elements 14 are designed for quickly and easily attaching the cooling fan (not shown) via a simple twist-and-lock arrangement. In this regard, it will be noted that the cooling fan typically has a plurality of fan blades extending from a central hub. The hub may include a corresponding number of circumferential slots 51 for receiving and engaging with each of the respective lobe elements 14 in a rotationally fixed, locking interconnection. It will be appreciated by persons skilled in the art, however, that instead of the lobe elements 14, a variety of alternative fastening elements may be provided for effecting attachment with the hub of the cooling fan. For example, one or more clips and/or threaded bores and/or screws are also contemplated for fastening the cooling fan hub to the flange or plate member 13.

Figure 6:
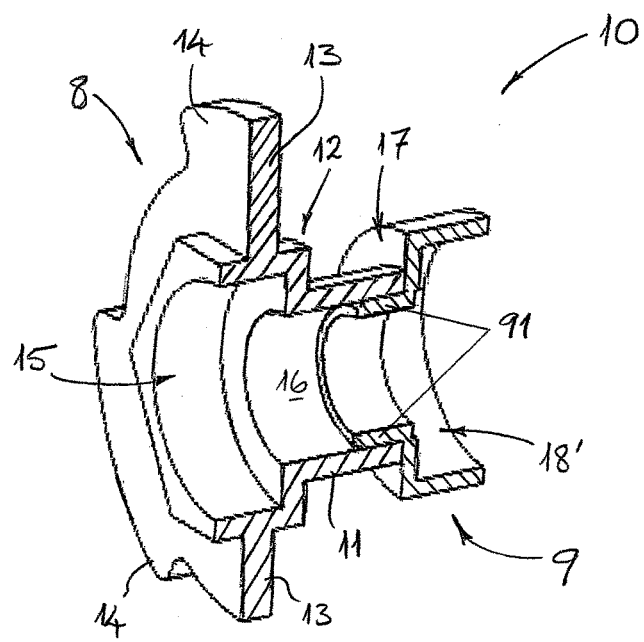
FIG. 6 shows a sectioned perspective view of an adapter device for a cooling fan module according to a second embodiment of the invention.
Figure 7:
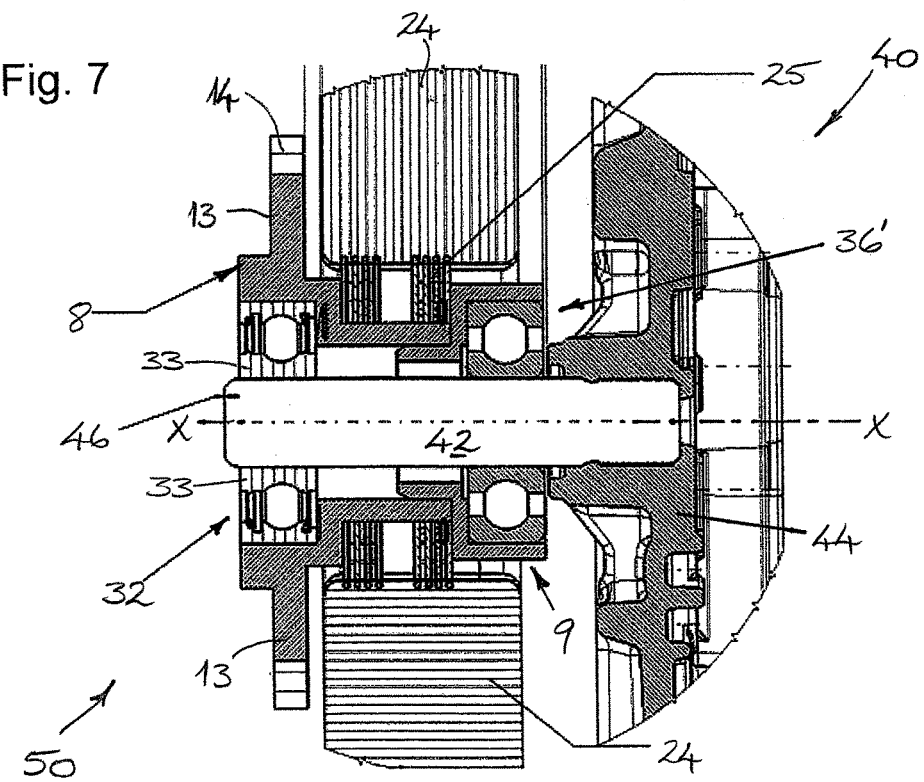
FIG. 7 shows a partial cross-section of a motor assembly in a cooling fan module of the second embodiment incorporating the adapter device of FIG. 6.

With reference now to FIGS. 6 and 7 of the drawings, a second embodiment of the invention is illustrated. Whereas the first embodiment described above with the first roller bearing 32 and the second bushing or journal bearing 36 is particularly suitable for cooling fan modules 50 of lower power (e.g. 300 to 600 W), the second embodiment is preferred for cooling fan modules 50 of higher power (e.g. 800 to 1200 W). Instead of a bushing or journal bearing, in the second embodiment the second bearing 36' is provided in the form of another roller bearing to ensure more precise axial orientation of the rotor 20. As a result, an inner ring of the second roller bearing 36' is also designed for rotationally fixed engagement with the shaft or axle 42 of the motor 40 and so cannot be simply slid along the shaft or axle like the bushing 36 in the first embodiment during assembly of the cooling fan module 50.

This second embodiment, therefore, contemplates a two-part construction for the adapter device 10 comprising a first part 8 for the front side of the rotor 20 and a second part 9 for the rear side of the rotor. The first part 8 of the adapter device 10 has features essentially corresponding to those features described with respect to the adapter device 10 of the first embodiment, except that the hollow stub 11 is slightly truncated or shorter than was previously the case. Furthermore, the recess or cavity 18 for accommodating the second bearing 36' is provided in the second part 9. The second part 9 of the adapter device 10 in this second embodiment thus includes a circular cylindrical cavity 18' forming a second bearing socket designed to receive and engage with an outer ring of the second roller bearing 36', e.g. in a press-fit or interference fit or via an adhesive, for rotationally fixed engagement therewith. This preassembly of the second part 9 of the adapter device 10 with the second roller bearing 36' may occur either before or after the inner ring of the second bearing 36' is fixed on the shaft 42 of the motor 40 in a preliminary operation. In a separate operation, the first part 8 of the adapter device 10 is preassembled with the rotor body 22 in a rotor subassembly. Thereafter, the rotor subassembly incorporating the first part 8 of the adapter device 10 is mounted on the shaft 42 in such a way that a collar 91 at a front end of the second part 9 is received in and engages with the bore 16 of the stub 11 for firm connection therewith, e.g. via a press-fit or interference fit or via adhesive fastening, and the inner ring 33 of the first roller bearing 32 is simultaneously fixed onto the free end 46 of the shaft 42, as described for the first embodiment.

Figure 8:
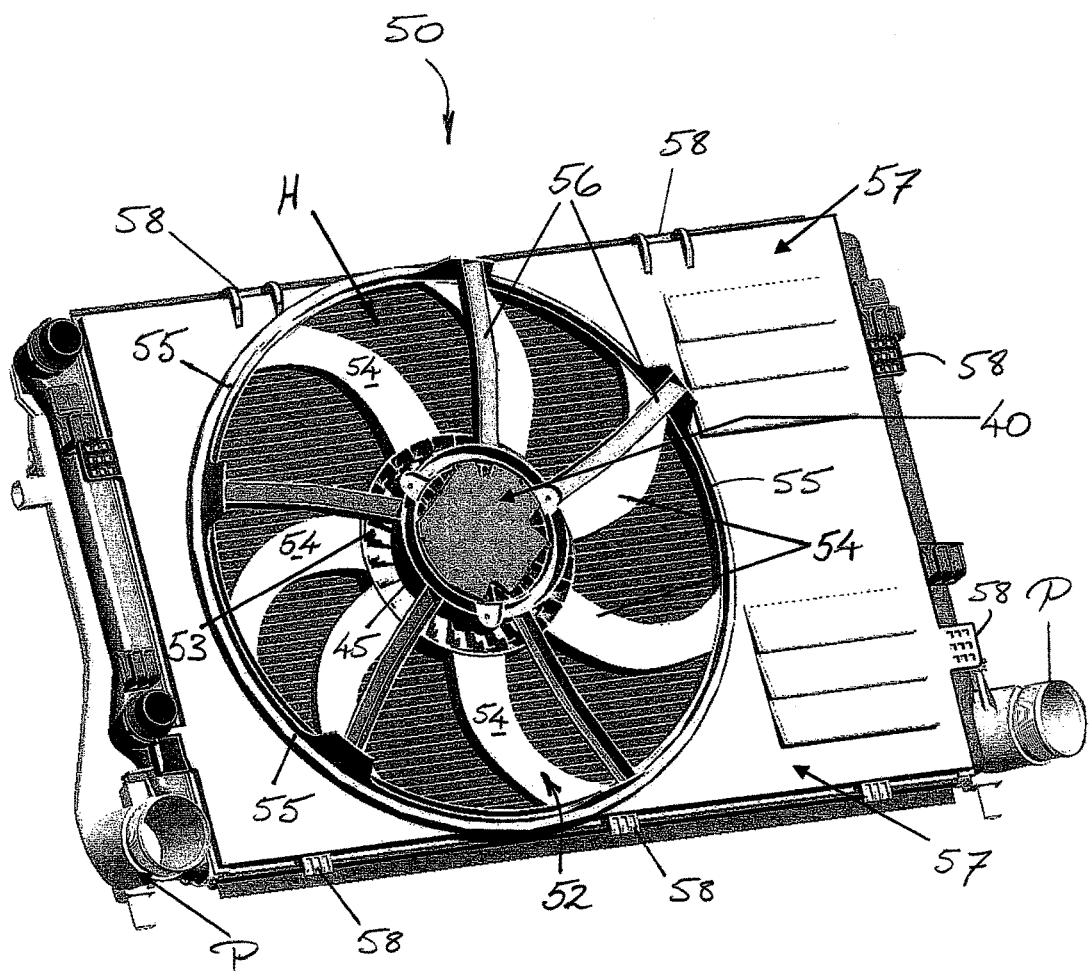
FIG. 8 shows a perspective view of a cooling fan module of the invention in use.

With each of the first and second embodiments described above, the cooling fan module 50—as illustrated in FIG. 8 of the drawings—is configured to be mounted on or adjacent to the automobile heat exchanger or "radiator" H, so that the cooling fan 52 (now clearly shown) generates a forced flow of air over or through the heat exchanger H to remove heat from the liquid coolant. The inlet and outlet pipe connections P for the heat exchanger H (i.e. the radiator, condenser or intercooler assembly) are also apparent from FIG. 8. As can be seen, the cooling fan 52 has a hub 53 and several fan blades 54 which extend from the fan hub. In this regard, the cooling fan module 50 includes a ring-like shroud 55 which extends around or encloses the cooling fan 52 at the front side of the motor 40 and forms a safety guard around the fan. The shroud 55 may be securely connected with the motor housing 45 of the module 50, e.g. via radially extending struts 56, and is typically integrally formed with a mounting plate 57, which may itself include fastening or mounting means 58, e.g. in the form of clips or brackets, for reliably and securely mounting the cooling fan module 50 to the radiator H such that the cooling fan 52 is positioned directly adjacent to the heat exchanger for removing heat from the liquid coolant.

While embodiments and applications of this invention have been shown and described above, it should be apparent to those skilled in the art that many more modifications (than mentioned above) are possible without departing from the inventive concept described herein. As such, the invention is not restricted except in the spirit of the appended claims. Accordingly, it is intended that the foregoing detailed description be regarded as illustrative rather than limiting and that the following claims include all equivalents that are intended to define the spirit and the scope of this invention. Nor is anything in the foregoing description intended to disavow the scope of the invention as claimed or any equivalents thereof.

In this document, the terms "comprise", "comprising", "have", "having", "include", "including", "contain", "containing" and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Further, the terms "a" and "an" used herein are intended to be understood as meaning one or more unless explicitly stated otherwise.

LIST OF REFERENCE NUMERALS 8 first part
9 second part
10 adapter device
11 stub
12 end region
13 flange or plate member
14 lobe element
15 first cavity or recess
16 stub bore
17 opposite end region
18 second cavity or recess
19 stub outer surface
20 rotor
22 rotor body
24 permanent magnet
25 lamination core segments
26 hole or opening
30 rotor subassembly
32 first bearing
33 inner ring
34 outer ring
35 roller element
36 second bearing
36' second bearing
37 internal diameter of second bearing
38 internal diameter of first bearing
39 retainer clip
40 motor
42 shaft or axle
43 fixed end of shaft
44 housing wall
45 motor housing
46 free end of shaft
47 diameter of shaft
50 cooling fan module
51 slot
52 cooling fan
53 fan hub
54 fan blade
55 shroud
56 strut
57 mounting plate
58 fastening or mounting means
91 collar
X rotor axis
H heat exchanger or radiator

The invention claimed is:

1. A cooling fan module for an automotive cooling system, comprising:
    a cooling fan having a hub and a plurality of fan blades extending from the hub;
    a motor for driving the cooling fan, the motor having a rotor mounted or supported for rotation about an axis on a fixed shaft or axle of the motor, the rotor carrying permanent magnets; and
    an adapter device, separate from the rotor, directly connecting the cooling fan to the rotor, wherein the adapter device comprises a connection member for rotationally fixed connection to a body of the rotor, and an attachment member for attachment with the hub of the cooling fan,
    wherein the connection member is inserted into a central aperture or opening of the rotor body and a surface of the connection member engages with the rotor body such that the adapter device is rotationally fixed thereto.

2. The cooling fan module of claim 1, wherein the connection member comprises a stub which is fixed to the rotor body proximate to or about the rotational axis of the rotor, and wherein the adapter device accommodates at least one bearing upon which the rotor is supported for rotation about the rotational axis.

3. The cooling fan module of claim 2, wherein the stub is hollow, and accommodates the shaft or axle of the motor upon which the rotor is supported for rotation about the axis, wherein the bearing receives and/or engages with the shaft or axle accommodated within the hollow stub.

4. The cooling fan module of claim 3, wherein the hollow stub is formed as a generally cylindrical sleeve or barrel.

5. The cooling fan module of claim 1, wherein an outer surface of the connection member engages with the rotor body or radially inner elements of the rotor body in a press-fit or an interference fit.

6. A cooling fan module for an automotive cooling system, comprising:

a cooling fan having a hub and a plurality of fan blades extending from the hub;

a motor for driving the cooling fan, the motor having a rotor configured for rotation about an axis, the rotor carrying permanent magnets; and an adapter device, separate from the rotor, directly connecting the cooling fan to the rotor, the adapter device comprising a connection member inserted in a central aperture or opening of the rotor body so that a surface of the connection member engages and is in rotationally fixed connection with the rotor, and an attachment member attached to the hub of the cooling fan, wherein the adapter device accommodates at least one bearing upon which the rotor is supported for rotation about the rotational axis.

7. The cooling fan module of claim 1 or claim 6, wherein the attachment member is provided at an end region of the connection member adjacent a face or side of the rotor body and includes one or more fastening elements for effecting attachment with the hub of the cooling fan.

8. The cooling fan module of claim 2 or claim 6, wherein the adapter device accommodates the at least one bearing in a cavity or recess formed in or adjacent to the connection member, and wherein the at least one bearing is a rotary bearing.

9. The cooling fan module of claim 8, wherein the adapter device accommodates a first bearing in a first cavity or recess formed at an end region of the connection member, and a second bearing in a second cavity or recess formed at an opposite end region of the connection member.

10. The cooling fan module of claim 9, wherein the adapter device has a multi-part structure comprising a first part with the first cavity or recess at the end region of the connection member adjacent to the attachment member, and a second part with the second cavity or recess at the opposite end region of the connection member.

11. The cooling fan module of claim 1 or claim 6, wherein the adapter device is formed as a separate component and assembled with the motor and the cooling fan.

12. The cooling fan module of claim 7, wherein the attachment member extends radially outwardly from the connection member formed as a flange or a plate.

13. The cooling fan module of claim 7, wherein the one or more fastening elements are arranged spaced apart around a circumference of the attachment member.

14. The cooling fan module of claim 8, wherein the rotary bearing is a roller bearing, a journal bearing or a bushing.

15. The cooling fan module of claim 6, wherein the surface of the connection member engages and is in rotationally fixed connection with the rotor via a press-fit or an interference fit.

16. A rotor subassembly for a motor in a cooling fan module of an automotive cooling system, comprising:

a rotor configured for rotation about a rotational axis in a motor, the rotor carrying permanent magnets; and an adapter device, separate from the rotor, for directly connecting a cooling fan to the rotor, wherein the adapter device comprises a connection member which is fixed in an aperture or opening of the rotor, and an attachment member provided at an end region of the connection member for attachment with the cooling fan, wherein a surface of the connection member in the aperture or opening engages and is fixed with the rotor and wherein at least one bearing is accommodated by the adapter device to support the rotor for rotation about the rotational axis in the motor.

17. The rotor subassembly of claim 16, wherein the connection member comprises a hollow stub in the form of a generally cylindrical sleeve or barrel, which is inserted and rotationally fixed in a central aperture or opening of the rotor and which is configured to accommodate a shaft or axle of the motor upon which the rotor is supported for rotation relative thereto, wherein the at least one bearing is configured to receive and/or engage with the shaft or axle accommodated within the hollow stub.

18. The rotor subassembly of claim 16, wherein the surface of the connection member engages and is fixed with the rotor in a press-fit or an interference fit.

* * * * *